Dec. 29, 1964
M. E. WALLIS
3,162,897
LIQUID FILM EXTRUDING HEAD
Original Filed Dec. 14, 1961
2 Sheets-Sheet 1
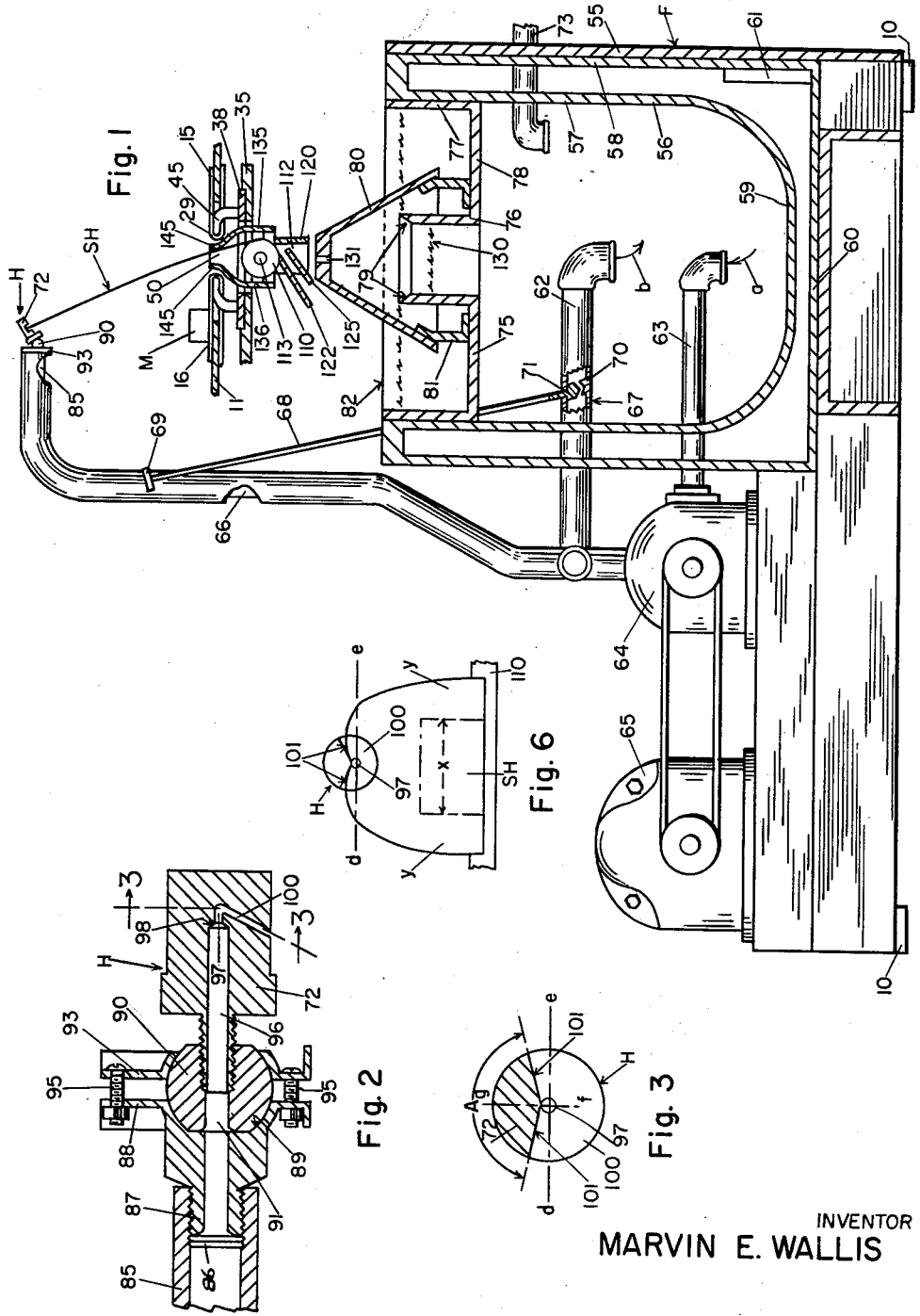
INVENTOR
MARVIN E. WALLIS
BY Chas. T. Hawley
ATTORNEY Dec. 29, 1964    M. E. WALLIS    3,162,897
LIQUID FILM EXTRUDING HEAD
Original Filed Dec. 14, 1961                2 Sheets-Sheet 2
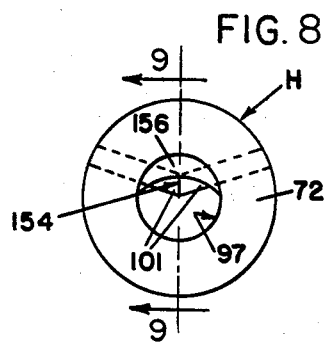
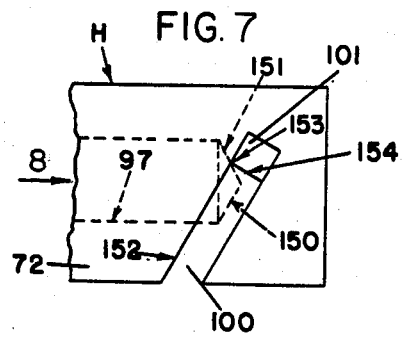
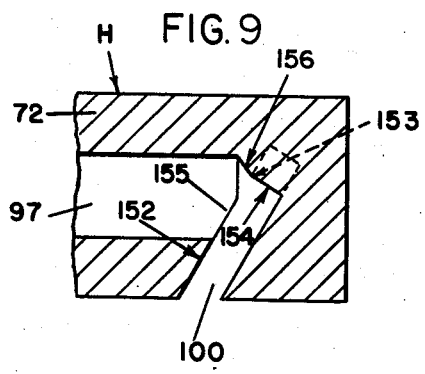
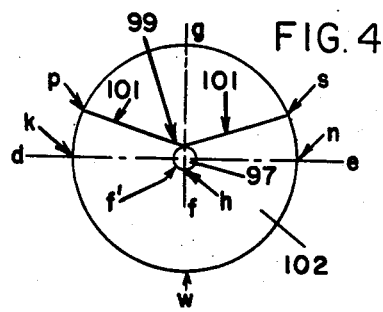
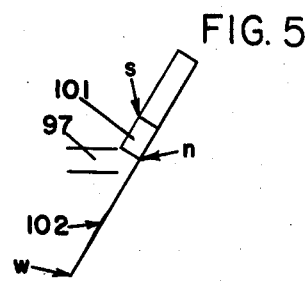
INVENTOR
MARVIN E. WALLIS
Chas. T. Hawley
ATTORNEY

United States Patent Office 3,162,897
Patented Dec. 29, 1964

3,162,897
LIQUID FILM EXTRUDING HEAD
Marvin E. Wallis, 1643 Woodland Drive,
San Luis Obispo, Calif.
Original application Dec. 14, 1961, Ser. No. 159,355. Divided and this application Dec. 13, 1962, Ser. No. 244,311
6 Claims. (Cl. 18—12)

This application is a division of my copending application, Serial No. 159,355, filed December 14, 1961, which application relates to improved means for packaging various kinds of articles such, for instance, as those which are presently wrapped in sheet material. This divisional application relates more particularly to an extruder head for converting high viscosity thermoplastic resinous material under pressure into a liquid film.

Much of the wrapping incident to packaging as practiced today requires the making of a sheet of wrapping material, folding it around the article, tucking the free ends of the sheet under the article, and then heat sealing the tucked under ends. Furthermore, the direction of motion of the article is changed at least twice in the operation of many wrapping machines.

It is an important object of the present invention to make thermoplastic material in film or sheet form so that an article can be passed through the sheet to effect an enveloping and/or packaging operation without requiring a folding operation and preferably without changing the direction of motion of the article.

It is a further object of the invention to provide an extrusion head for extruding a downwardly directed film or sheet of molten thermoplastic material and move an article through it in such manner as to cause the sheet to wrap around the article and form an airtight enclosing adherent wrapping.

The article is passed through the sheet by means of two conveyors the adjacent ends of which at a wrapping station are separated by a narrow space through which the aforesaid sheet can pass and fall into a tank between successive arrivals of articles at the wrapping station.

It is a still further object of the invention to provide an improved extruder head made in such manner as to produce a broad sheet and mounted so as to be adjustable angularly to change the plane of the sheet around horizontal and vertical axes.

The thermoplastic material may be any suitable plastic having the correct melt index, viscosity, transparency or color, tensile strength, resistance to passage of air or water, etc. Polyethylene has been used in the practice of the invention. This material melts at about 350° F. and has a viscosity of about 8000 to 10,000 centipoises and will produce a sheet having a thickness from ½ to 1½ mils. Other materials which may be used include liquid saran (polyvinylidene), polyvinyl chloride if highly plasticized, polypropylene, polystyrene, ethylene copolymers, etc.

In order that the invention may be clearly understood reference is made to the accompanying drawings which illustrate by way of example one embodiment of the invention and in which:

FIG. 1 is an elevation view of a machine having the invention applied thereto, certain of the parts being broken away and in cross section for the sake of clarity, FIG. 2 is a cross sectional view of the head and associated parts, required to extrude a thin wrapping film, FIG. 3 is a section taken on line 3—3, FIG. 2, FIGS. 4 and 5 are diagrammatic views of an enlargement of FIG. 3 and a side view thereof respectively, FIG. 6 is a diagrammatic view illustrating a sheet of the thermoplastic material of the form produced in the present invention, and FIGS. 7, 8, and 9 are diagrammatic views showing the method of manufacturing the head, FIG. 8 being taken in the direction of arrow 17 in FIG. 7.

Referring particularly to FIGURE 1, the frame F of the machine has legs 10 and a table top 11 supported on the legs.

Conveyor

The conveyor for the articles M to be wrapped includes two sets of narrow endless belts 15 and 16, the belts of each set preferably aligning the corresponding belts in the other sets. The belts are suitably tensioned and motor driven by means (not shown), and move in the same direction to convey articles M past the gap 50 between the belts.

Sub table 35 below table top 11 is mounted in fixed relation to table top 11 and supports brackets 46 in which pulleys 29 are mounted to support the belts 15 and 16.

It is to be understood that there are two rows of pulleys 29 separated from each other to define an elongated space 50 between them across which an article to be packaged can be passed from one set of belts to the other.

Plastic Sheet Producer

The mechanism for making the film or sheet of thermoplastic material includes a tank and heater to supply the molten material, an extruder head to discharge the sheet downwardly across the path traversed by the article to be packaged, provision for tensioning the sheet, and means to return the unused material to the tank.

Referring to FIG. 1, there is shown a wall 55 enclosing a tank 56 having inner and outer shells 57 and 58, respectively, and bottoms 59 and 60 for confining heated oil. The oil can be heated in any approved manner, as by electric heater 61. The jacket is entered by upper and lower pipes 62 and 63 respectively, the latter of which leads to a pump 64 belt driven by a motor 65. Leading upwardly from the pump is a pipe 66 which is connected to pipe 62 and continues upwardly as shown. Pipe 62 has therein a valve 67 controllable from above the jacket by rod 68 and hand grip 69. The valve has a conical seat 70 secured to pipe 62 and a valve head 71 which by turning rod 68 can be moved into the seat to close pipe 62, or be moved away from the seat to open the pipe. Valves to this type are well known. Inlet pipe 73 affords means for introducing fresh plastic material into the tank to compensate for that used up in the operation of the machine.

The amount of molten thermoplastic material which rises in pipe 66 toward the extruding head H is determined by the position of valve 67. If the valve is wide open there will be local circulation in the tank, molten material entering pipe 63, see arrow a, going through the pump and then through the valve and out of pipe 62, see arrow b. Little or no material reaches the head H under these conditions. If, on the other hand, valve 67 is partly closed molten material will rise to head H to produce a sheet, as will be described. Complete closure of valve 67 will effect delivery of molten material to head H under full pressure of the pump 64. Full pressure can be varied by changing the speed of motor 65, or in any manner which will change the operating conditions of the pump. During heating of the thermoplastic material up to operating temperature, or under other nonoperating conditions, the pump will be idle, or be operated slowly with valve 67 wide open.

Secured within the upper part of the tank is a well 75 of ring-like shape having inner and outer circular vertical walls 76 and 77 jointed by a bottom 78. The outer wall 77 is secured to inner wall 56 of the tank and the upper edge of the inner wall 76 is sharpened to a knife edge 79. A hollow cone 80 is placed as shown in FIGURE 1 and is held in position by feet 81 which are fastened to the inner part of the cone and to the floor 78 of the well. The knife edge 79 is lower than the top 82 of the tank and the bottom of the cone extends below the level of material normally in the well. The cone 80 serves as a deflector for hardened resin falling from above and requires the resin to move into the well and prevents it from falling into the tank.

The extruding head H is shown in FIGURES 2 through 9. The upper end 85 of pipe 66 has internal screw threads 86 which receive the screw threaded nipple 87 of a clamp member 88 having a concave spherical surface 89 into which fits a ball 90. A passage 91 through the ball is screw threaded to receive the externally threaded end of body 72 forming part of head H. A second clamp member 93 also has a concave spherical surface to fit the ball, and bolts or screws 95 clamp the members 88 and 93 together tightly to provide a tight leak-proof adjustable connection between pipe 85 and body 72. The ball 90 permits limited universal adjustment of the body 72 to accommodate the latter to a variety of operating conditions.

The body 72 has a cavity or bore 96 from which leads a short small passage 97. The end of cavity 96 is cone-shaped as at 98 to cause the molten plastic material under pressure to move toward the passage 97. A transverse oblique slot 100 communicates with passage 97 and extends downwardly and is inclined rearwardly or in a direction the opposite to that in which the molten material approaches passage 97, as viewed in FIGURE 2.

FIGURE 3 shows a significant feature of the slot 100. The transverse areas 101 wich define the upper configuration of the interior of slot 100 are at an angle A to each other less than 180°, preferably about 140°, and this angle is bisected by a vertical plane of symmetry line gf passing through the axis of passage 97. The vertex of this angle is indicated at 99 in FIGURE 4. The angle between the slot 100 and the axis of body 72 as viewed in FIGURE 2 is about 60°. This angle in cooperation with surfaces 101 requires some at least of the molten plastic material to reverse its direction of flow and emerge from the orific of the slot 100 in a generally left-hand direction as shown in FIGURE 2.

FIGURES 4 and 5 show diagrammatically an enlargement of FIGURE 3 and an enlarged side view of FIGURE 3, respectively. FIGURE 6 shows an elevaiton of a sheet of thermoplastic material of the form produced by the present invention. In FIGURE 4 line d—e passes horizontally through the small circle f' representing the stream of molten material in passage 97. Vertical line fg intersects the circle of the body at h, and line d—e intersects the circle at k and n. The lines f'p and f's represent the upper transverse limiting edges 101 of the slot 100. The lowest point of the slot is represented at w in FIGURES 4 and 5.

Tension of Plastic Sheet

The head H, which defines in general the locale of extrusion of the film, is adjusted so that the film or sheet SH of molten thermoplastic material can be directed into the space 50 between the ends of the belts 15 and 16. Directly under this space there is mounted a roll 110 which turns below the belts 15 and 16 but above the cone 80. This roll is mounted for rotation in bearings (not shown) depending from sub table 35. The axis of the roll is parallel to the length of space 50 and the roll has a shaft 113 to which is connected a driver (not shown).

The rate at which roll 110 turns is such that its peripheral speed will be somewhat more than the rate of travel of sheet SH toward it. Because of this relation in rates the sheet will be under some tension which tends to orient the particles of which the sheet is made, and also tends to make the sheet transparent. The roll is able to tension the sheet SH due to the fact that the latter is adhesive and sticks to the cylindrical surface of the roll. The periphery of the roll can be considered to be a traveling surface, and the roll acts as a draft means on the film.

In order to remove the plastic material which accumulates on the roll there are provided scraper or doctor blades. A primary blade 120 is held in place on suitable supports. The upper edge of this blade does not normally touch the roll but is spaced from it slightly so as to cut off the outer part of the accumulated plastic. The remainder of the platsic is removed by a secondary blade 122. This second blade is set closer to the roll than is blade 120 and normally engages the roll to scrape off all the remaining plastic material. A guide plate 125 mounted as shown close to the secondary blade directs material removed by it to the left-hand side of the cone 80 as viewed in FIGURE 1.

The plastic material which is scraped from roll 110 falls on cone 80 and then moves into the well 75. The level of molten material in the tank is maintained high enough, as at line 130, so that its heat will keep the material in the well fluid and enable it to melt material entering the well from the cone. As material falls into the well it carries air bubbles with it and also causes the molten material already in the well to flow over air releasing knife edge 79 and into the tank, which is a receiver for air-free resin. A vent 131 in the top of cone 80 prevents formation of an air trap which would otherwise interfere with passage of material from the well over edge 79.

FIG. 1 illustrates two shields serving to prevent the plastic sheet from getting onto the belts 15 and 16, thus protecting the latter from undesired accumulation of resin. The right and left-hand shields 135 and 136 respectively are suitably supported by the plate 35.

The upper edges of the shields are oppositely curved at 145 as shown in FIGURE 1 to partly at least enclose the adjacent ends of the belts 15 and 16. The previously mentioned space 50 is defined by the curved edges 145. The lengthwise centerline of this slot is slightly to the right of a vertical plane passing through the axis of roll 110.

Returning to the extruding head H, part of the method of its manufacture is shown in FIGURES 7, 8, and 9. These figures are enlarged views showing diagrammatically how the drilling and slot cutting operations are done. The passage 97 is made by a drill the cutting edges of which are at an oblique angle to the drill axis and leave a concave conical surface 150 indicated in FIGURE 7. The elements of the cone, as 151, are at about 60° to the axis of passage 97.

Slot 100 is then cut at an angle of about 60° to the axis of passage 97 to a depth of slightly more than half the diameter of body 72. The left-hand side 152 (FIGURE 7) of the slot cuts across the concave conical surface about as shown in FIGURE 7 at some such point as 153 on element 151. The height of slot 100 at this point in the process is indicated by line 154. Then by two subsequent cutting operations slot 100 is extended obliquely upwardly on each side of the centerline fg to form the sides or walls 101 already mentioned. Cutting of the slot removes the lower part of the concave conical surface and cuts back somewhat into the cylindrical part of passage 97, as at 155.

At the upper part of the right-hand end (FIGURE 9) of passage 97 there is a surface 156 inclined downwardly and away from the open end of cavity 96, being the remainder of the concave conical surface already mentioned. It serves to deflect downwardly into slot 100 molten plastic material moving out of the passage 97. The surfaces 101 (FIGURE 8) define the upper internal boundaries of slot 100 and form angle A against which the downwardly deflected material impinges. The walls 101 serve to deflect laterally molten material moving toward them. These downward and lateral deflections combine to give the film or sheet SH the form shown in FIGURE 6. The axis of the conical surface coincides with the axis of bore 97 and extends across slot 100.

The body 72 is preferably cylindrical and due to the angle of slot 100 the distance from the central axis of body 72 to the surface of the latter, measured along slot 100 to point $w$, is greater than the distance measured horizontally. Since slot 100 has parallel sides more resistance is offered to movement of resin to point $w$ than to points $k$ and $n$ and this difference compensates for the fact that the shorter central part of the film, FIGURE 11, requires less material than does the outer curved part.

It is believed that the operation of the machine will be apparent from the foregoing description. After the plastic material has reached its proper temperature, such for instance as 350°, and the pump has been set in operation to develop a pressure ranging from 250 p.s.i. to 1000 p.s.i., and valve 67 closed, a liquid film of the plastic material will issue from the slot 100 and be projected downwardly toward the slot 50.

During operation of the machine the article M to be coated will be placed on the conveyor belts 16 and as shown in FIG. 1 will be moved from left to right. The rotating roll 110 will tend to tension the liquid film or sheet SH and will strengthen it and at the same time tend to make it more transparent. As the article approaches the sheet, the leading upper part will strike the sheet and as the article continues to move part at least of the sheet will be deposited on and around it and as the article passes through the enveloping zone it will be transferred from belts 16 to belts 15.

As the film leaves the top of the package it will follow down along the trailing end of the package and upon reaching the bottom of the package will break away from the latter and reestablish its contact with the roll before the next article arrives. If the package is placed on the conveyor obliquely with a corner leading then the top and two sides will be enveloped by a single pass and a second pass, with the package reversed and inverted, will complete the operation.

As the machine continues to run some of the resin or plastic material will accumulate on roll 110 and will be removed and fall into the well where it will be melted sufficiently to pass over the knife edge 79 of the well. This edge will have the effect of requiring the molten material to become very thin and bend down at a sharp angle so that any bubbles or air accumulations in the resin will in all likelihood burst so that upon arrival at the tank the material will be substantially free from occuded air.

Reference to FIGURE 6 will call attention to another feature of the invention. Prior to arrival of an article M at the film SH the latter will be a continuous sheet connected adhesively for its full width to roll 110. When the article M moves into the film the latter will be interrupted for the width of the article, as for instance for the space $x$ and the film will lose its contact with roll 110 for this portion of its width. The parts $y$ of the film beyond, or at the sides of, space $x$ will, however, remain in contact with the roll, and as the article leaves the film these parts, still connected to the upper part of the film, will draw the intermediate part of the film back to the roll.

It has already been stated that the rate of travel of the periphery of roll 110 is greater than the rate of travel of the film toward the roll in order to tension the film to orient it, but it should be noted that the articles being enveloped can also be moved at a rate greater than that of the film.

Having now particularly described and ascertained the nature of the invention and in what manner the same is to be performed, what is claimed is:

1. A head for extruding a high viscosity thermoplastic resinous material introduced thereinto under pressure into a film, comprising a body having a cross-sectional shape symmetrical about a plane of symmetry and having a bore with an axis lying in said plane and extending at one end to an opening for receiving said material, said body having a slot disposed normal to said plane and extending through the body on both sides thereof to form a discharge orifice, the slot having walls making angles substantially less than 90° with the axis of the bore, the distance through the slot from the bore to the orifice being greater at said plane of symmetry and decreasing on each side thereof as the distance from said plane increases.

2. The head as set forth in claim 1, wherein the body is a cylinder having an axis which coincides with the axis of said bore so that when said plane is vertically oriented, the slot will be longer in the downward direction than in the horizontally outward directions to provide greater resistance to flow of the material in the former than in the latter directions to provide a wide film of substantially constant thickness.

3. The head set forth in claim 1 wherein the head has an inclined deflecting surface extending partly across the end of the bore adjacent to said slot and inclined toward the slot and away from said one end of the bore, and effective to deflect the material moving out of the bore toward the slot.

4. The head set forth in claim 3, wherein the boundary of the slot within the body is defined by two internal walls which form an angle of less than one hundred and eighty degrees with each other and against which resinous material is directed by said inclined surface.

5. The head set forth in claim 1, wherein the body has an inclined deflecting surface extending partly across the end of the bore adjacent to said slot, said surface comprising part of a cone having an axis coincident with the axis of the bore and extending into said slot.

6. The head set forth in claim 1, wherein the boundary of the slot within the body is defined by two lateral walls which form an angle with each other of less than one hundred and eighty degrees.

References Cited in the file of this patent
UNITED STATES PATENTS
3,085,289   Van Riper _____ Apr. 16, 1963